(12) United States Patent
Taylor et al.

(10) Patent No.: US 6,249,574 B1
(45) Date of Patent: Jun. 19, 2001

(54) ANTI-STUFFING DEVICE

(75) Inventors: Darrell Taylor, Duluth; Manfred Waldecker, Lawrenceville, both of GA (US)

(73) Assignee: Elcotel, Inc., Sarasota, FL (US)

( * ) Notice: Subject to any disclaimer, the term of this patent is extended or adjusted under 35 U.S.C. 154(b) by 0 days.

(21) Appl. No.: 09/405,496

(22) Filed: Sep. 24, 1999

(51) Int. Cl.⁷ .................................................. H04M 17/00
(52) U.S. Cl. .......................... 379/150; 379/145; 194/202
(58) Field of Search .................................. 379/143, 146, 379/147, 148, 149, 150, 153, 155; 194/202

(56) References Cited

U.S. PATENT DOCUMENTS

| | | | |
|---|---|---|---|
| 5,018,193 | * | 5/1991 | Dearkland ............................. 379/145 |
| 5,102,038 | * | 4/1992 | Anello et al. ......................... 379/145 |
| 5,361,979 | * | 11/1994 | Anello et al. ......................... 379/145 |
| 5,400,396 | * | 3/1995 | Hsu ....................................... 379/145 |
| 5,411,207 | * | 5/1995 | Ashkenazi ............................. 379/145 |
| 5,431,338 | * | 7/1995 | Ashkenazi ............................. 379/145 |
| 5,483,583 | * | 1/1996 | Chen ..................................... 379/146 |
| 5,727,054 | * | 3/1998 | Anello et al. ......................... 379/145 |
| 5,787,158 | * | 7/1998 | Anello et al. ......................... 379/145 |
| 6,098,876 | * | 8/2000 | Cheng ................................... 379/145 |

* cited by examiner

*Primary Examiner*—Duc Nguyen
*Assistant Examiner*—Rexford N Barne
(74) *Attorney, Agent, or Firm*—Schnader Harrison Segal & Lewis LLP

(57) ABSTRACT

A coin return assembly having enhanced protection against stuffing or ignition, is disclosed. A flapper member is hingedly attached to the upper portion of the coin return chute such that it is biased against displacement against the flow of coins through the coin chute. The hinge allows movement of the coins from the upper portion of the telephone through to the lower bucket area. The flapper seals substantially the entire coin path thereby preventing the insertion of stuffing material into the coin return chute or the passage of flames therethrough.

5 Claims, 1 Drawing Sheet

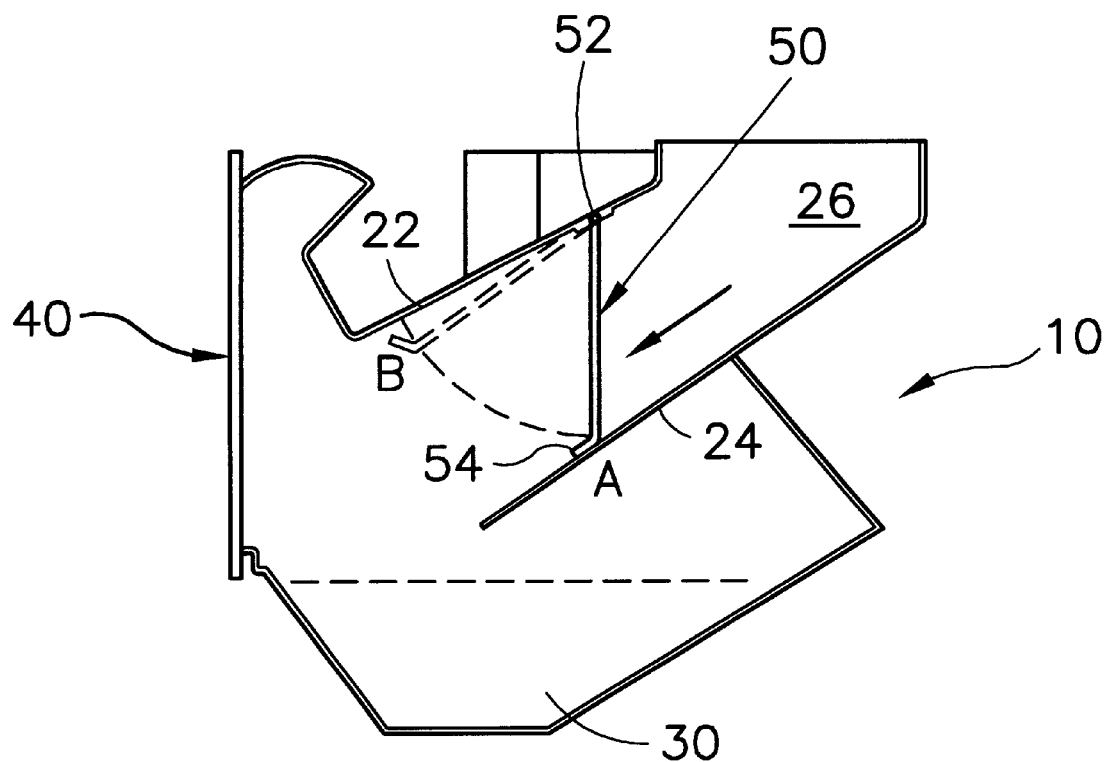

ANTI-STUFFING DEVICE

BACKGROUND OF THE INVENTION

1. Field of the Invention

The invention relates an anti-stuffing device for use on a pay telephone. More specifically, the invention relates to a coin return assembly having a hinged member within the coin return chute of a pay telephone.

2. Description of Related Art

Public telephones, and consequently their users, are often the victims of vandals and thieves. As is well known, a typical pay telephone has a coin deposit slot near the top of the phone, and a coin return near the bottom of the phone. Returned coins pass through a coin return chute which empties into a coin return bucket. Coins are retrieved by the user through an opening in the front face of the telephone. Often, there is a hinged door on the face of the phone through which access to the coin bucket area is gained by inserting a finger through an opening pushing the door into the bucket area. In some cases, this design is used to partially block the coin return chute so that foreign material may not be placed up into the coin return chute. Other designs take into account that the phone user may wish to see inside the coin bucket area before inserting his finger for retrieving the coins.

Would-be thieves jam foreign material up into the coin return chute through the opening either manually or with the aid of a thin wire. Similarly, a thief can pass foreign material through the coin slot with the aid of a thin wire. In either situation, the coin path is blocked. When the pay phone is so stuffed, coins are prevented from being returned to the calling customer. The would-be thief then later returns and removes the stuffing material at which time the coins fall through the phone to the return bucket for collection by the thief.

Typically, the thief will remove the stuffing material by inserting a thin wire into the coin return chute and pulling the material through the opening. Some telephones have a wire cutting device in the coin path to prevent thieves from using this method Alternatively, the thief may use flammable material for stuffing. When he is ready to collect the coins, the thief will fill the coin bucket with gasoline or lighter fluid. The thief then ignites the fluid which sends flames up through the coin return chute burning the flammable stuffing material and clearing the path for coins. In the same manner, vandals may set the phone on fire.

Paper or plastic material is often used as the flammable stuffing material. When plastic is used, it creates the added problem of leaving melted plastic particles throughout the inside of the telephone.

Other phones are designed with mechanisms to prevent a coin tethered to a string from being repeatedly passed by the coin sensor. Typically, a mechanism is provided to prevent coins from traveling backwards through the coin path so that a single coin cannot register more than once. These mechanisms do not address problems related to stuffing the telephone from the coin return.

Accordingly, it is desirable to have a coin return apparatus that is provided with means for preventing the stuffing or spread of flames up through the coin return chute into more sensitive areas of the telephone.

SUMMARY OF THE INVENTION

A hinged member attached to an upper portion of a coin return chute in a pay telephone is disclosed. The member covers substantially the entire open area of the coin return chute. The hinged flap member prevents material from being stuffed up the return chute, while simultaneously inhibiting the flow of flames through the upper portion of the telephone when material in the coin bucket is ignited.

BRIEF DESCRIPTION OF THE DRAWING

The Drawing is a cross-sectional view of a coin return bucket with the anti stuffing device of the invention.

DETAILED DESCRIPTION OF THE INVENTION

Referring to the Drawing, a coin return 10 assembly is shown. The coin return assembly 10 is connected to an upper portion of the phone by a coin return chute. The coin return chute opens into a bucket area 30 for collecting returned coins. Access is gained to the bucket area 30 through an opening 40 in the face plate of the telephone which leads into the bucket area 30.

The coin return chute is preferably angled so that coins are directed by gravity from the upper part of the phone to the bucket area 30. The coin return chute is defined by upper and lower walls 22, 24 interconnected by two side walls 26 preferably defining an internal rectangular cross-sectional coin path. Although this rectangular configuration is preferred, other arrangements may be used.

According to the invention, a hinged flap member 50 is located within the coin return chute. The flapper 50 is a plate-like member preferably constructed of flame and tamper resistant material such as steel or other suitable materials. The flapper 50 is attached by a hinge 52 to the upper wall 22 of the coin return chute. The hinge 52 allows for displacement of the flapper 50 from a first, closed position A to a second, open position B which allows coins to pass through the coin return chute into the bucket area 30. The hinge 52 prevents rotation of the flapper 50 beyond the first position A in a direction opposed to the direction of coin flow C. The flapper 50 is sized to occupy substantially the entire cross-sectional area of the coin return chute thereby inhibiting stuffing or the passing of flames therethrough.

The flapper 50 is attached to the upper wall 22 of the coin return chute by a hinge 52 biased to the first, closed position A by gravity. The lower end of the flapper 50 is preferably provided with a flange 54 for engaging the lower wall 24 of the coin return chute. The flange 54 serves the purpose of providing additional contact with the lower wall 24 of the coin return chute to prevent the insertion of a thin wire or the passage of flames to the upper portion of the phone. In operation, the hinged flapper 50 remains in a closed position A, sealing the coin return chute until coins are returned. When a calling customer deposits coins and then seeks a return, the coins are directed to the coin return chute where they pass through along the coin path and push open the hinged flapper 50 when passing through to the bucket area 30. The customer then retrieves the coins from the bucket area 30. A would-be thief or vandal who attempts to stuff the phone will not be able to insert any materials past the hinged flapper 50. Accordingly, only the bucket area 30 can be stuffed. The stuffing material then would be readily apparent to users of the telephone who could avoid this particular phone.

Where the phone has been stuffed from above, through the upper coin slot, the thief will be unable to remove the stuffing from below. Stuffing is difficult or impossible to remove through the upper coin slot. Typically the thief removes the stuffing from below, or through ignition of flammable material in the return bucket 30. The hinged flapper 50 inhibits the flow of flames through the coin return chute, confining the flames to the coin bucket area 30. Thus, the flap member 50 prevents stuffing or removal of stuffing material by blocking access to the coin return chute by thieves.

The invention satisfies the need for improved stuffing and vandal protection of public pay telephones.

What is claimed is:

1. A coin return assembly for a coin-operated telephone, comprising:

(a) a coin return bucket;

(b) a coin return chute leading from an upper portion of the phone to an open portion above said bucket; and (c) a flapper member hinged to an upper wall of said return chute for displacement between a first, closed position and a second, open position by action of coins passing therethrough, wherein said flapper member is provided with a lower flange which engages and planarly contacts the lower wall of said coin return chute when in said first, closed position and wherein said member is prevented from being displaced in a direction opposite coin flow beyond said first position by engagement with a bottom wall of said return chute.

2. The coin return assembly of claim 1 wherein said flapper is sized and configured to cover substantially the entire cross-sectional area of said coin return chute.

3. The coin return assembly of claim 1, wherein said flapper member is biased in said first, closed position via gravity.

4. The coin return assembly of claim 1, wherein said flapper member comprises non-flammable material.

5. The coin return assembly of claim 1, wherein said lower flange is defined by a terminal edge portion, an upper planar surface, and a lower planar surface; and wherein said lower planar surface engages and contacts, along substantially its entire planar surface, a planar surface of the lower wall of the coin return chute.

* * * * *